(12) United States Patent
Seow et al.

(10) Patent No.: US 9,111,148 B2
(45) Date of Patent: Aug. 18, 2015

(54) UNSUPERVISED LEARNING OF FEATURE ANOMALIES FOR A VIDEO SURVEILLANCE SYSTEM

(71) Applicant: BEHAVIORAL RECOGNITION SYSTEMS, Inc., Houston, TX (US)

(72) Inventors: Ming-Jung Seow, Houston, TX (US); Wesley Kenneth Cobb, The Woodlands, TX (US)

(73) Assignee: BEHAVIORAL RECOGNITION SYSTEMS, INC., Houston, TX (US)

( * ) Notice: Subject to any disclaimer, the term of this patent is extended or adjusted under 35 U.S.C. 154(b) by 72 days.

(21) Appl. No.: 13/929,494

(22) Filed: Jun. 27, 2013

(65) Prior Publication Data
US 2014/0003710 A1 Jan. 2, 2014

Related U.S. Application Data

(60) Provisional application No. 61/666,359, filed on Jun. 29, 2012.

(51) Int. Cl.
*G06K 9/46* (2006.01)
*G06K 9/62* (2006.01)
*G06K 9/00* (2006.01)

(52) U.S. Cl.
CPC .......... *G06K 9/00771* (2013.01); *G06K 9/6218* (2013.01)

(58) Field of Classification Search
CPC ....... G06K 9/46; G06K 9/00093; G06K 9/00; G06K 9/00771; G06K 9/6218
USPC ......... 382/103, 100, 224, 115, 160, 169, 286, 382/155, 165, 190, 195, 199, 225, 291, 382/159; 348/143, 169, 155, 161; 340/853.2
See application file for complete search history.

(56) References Cited

U.S. PATENT DOCUMENTS 4,679,077 A 7/1987 Yuasa et al.
5,113,507 A 5/1992 Jaeckel
(Continued)

FOREIGN PATENT DOCUMENTS

WO 2009049314 A2 4/2009
WO 2010111748 A1 10/2010

OTHER PUBLICATIONS

J. Connell et al., "Detection and Tracking in the IBM PeopleVision System," IEEE ICME, Jun. 2004: pp. 1-4, <http://www.research.ibm.com/peoplevision>.

(Continued)

*Primary Examiner* — Sheela Chawan
(74) *Attorney, Agent, or Firm* — Patterson & Sheridan, LLP

(57) ABSTRACT

Techniques are disclosed for analyzing a scene depicted in an input stream of video frames captured by a video camera. In one embodiment, e.g., a machine learning engine may include statistical engines for generating topological feature maps based on observations and a detection module for detecting feature anomalies. The statistical engines may include adaptive resonance theory (ART) networks which cluster observed position-feature characteristics. The statistical engines may further reinforce, decay, merge, and remove clusters. The detection module may calculate a rareness value relative to recurring observations and data in the ART networks. Further, the sensitivity of detection may be adjusted according to the relative importance of recently observed anomalies.

22 Claims, 4 Drawing Sheets

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 8,270,732 B2 * | 9/2012 | Cobb et al. | 382/224 |
| 8,270,733 B2 * | 9/2012 | Cobb et al. | 382/224 |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0138338 A1 | 6/2006 | Tezuka et al. | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0250898 A1 | 10/2007 | Scanlon et al. | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0210373 A1 | 8/2009 | Yu et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2010/0150471 A1 | 6/2010 | Cobb et al. | |
| 2010/0322516 A1 | 12/2010 | Xu et al. | |
| 2011/0052068 A1 * | 3/2011 | Cobb et al. | 382/190 |
| 2012/0163670 A1 | 6/2012 | Eaton et al. | |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

International Search Report for PCT/US2013/048308 dated Oct. 11, 2013.

* cited by examiner

UNSUPERVISED LEARNING OF FEATURE ANOMALIES FOR A VIDEO SURVEILLANCE SYSTEM

CROSS-REFERENCE TO RELATED APPLICATIONS

This application claims priority to U.S. provisional application having Ser. No. 61/666,359, filed on Jun. 29, 2012, which is hereby incorporated by reference in its entirety.

BACKGROUND OF THE INVENTION

1. Field of the Invention

Embodiments of the invention provide techniques for analyzing a sequence of video frames. More particularly, to analyzing and learning behavior based on streaming video data, including unsupervised learning of feature anomalies.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of pre-defined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically are unable to identify or update objects, events, behaviors, or patterns (or classify such objects, events, behaviors, etc., as being normal or anomalous) by observing what happens in the scene over time; instead, such systems rely on static patterns defined in advance. For example, such surveillance systems are unable to, without relying on pre-defined maps or patterns, distinguish feature anomalies (e.g., unusual shininess at a particular location) in a scene from ordinary features (e.g., ordinary shininess at the same location) in the scene and report instances of feature anomalies to a user.

SUMMARY OF THE INVENTION

One embodiment provides a method for analyzing a scene observed by a video camera. The method includes receiving kinematic and feature data for an object in the scene and determining, via one or more processors, a position-feature vector from the received data, the position-feature vector representing a location and one or more feature values at the location. The method further includes retrieving a feature map corresponding to the position-feature vector, wherein the feature map includes one or more position-feature clusters. In addition, the method includes determining a rareness value for the object based at least on the position feature vector and the feature map, and reporting the object as anomalous if the rareness value meets given criteria.

Other embodiments include a computer-readable medium that includes instructions that enable a processing unit to implement one or more embodiments of the disclosed method as well as a system configured to implement one or more embodiments of the disclosed method.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
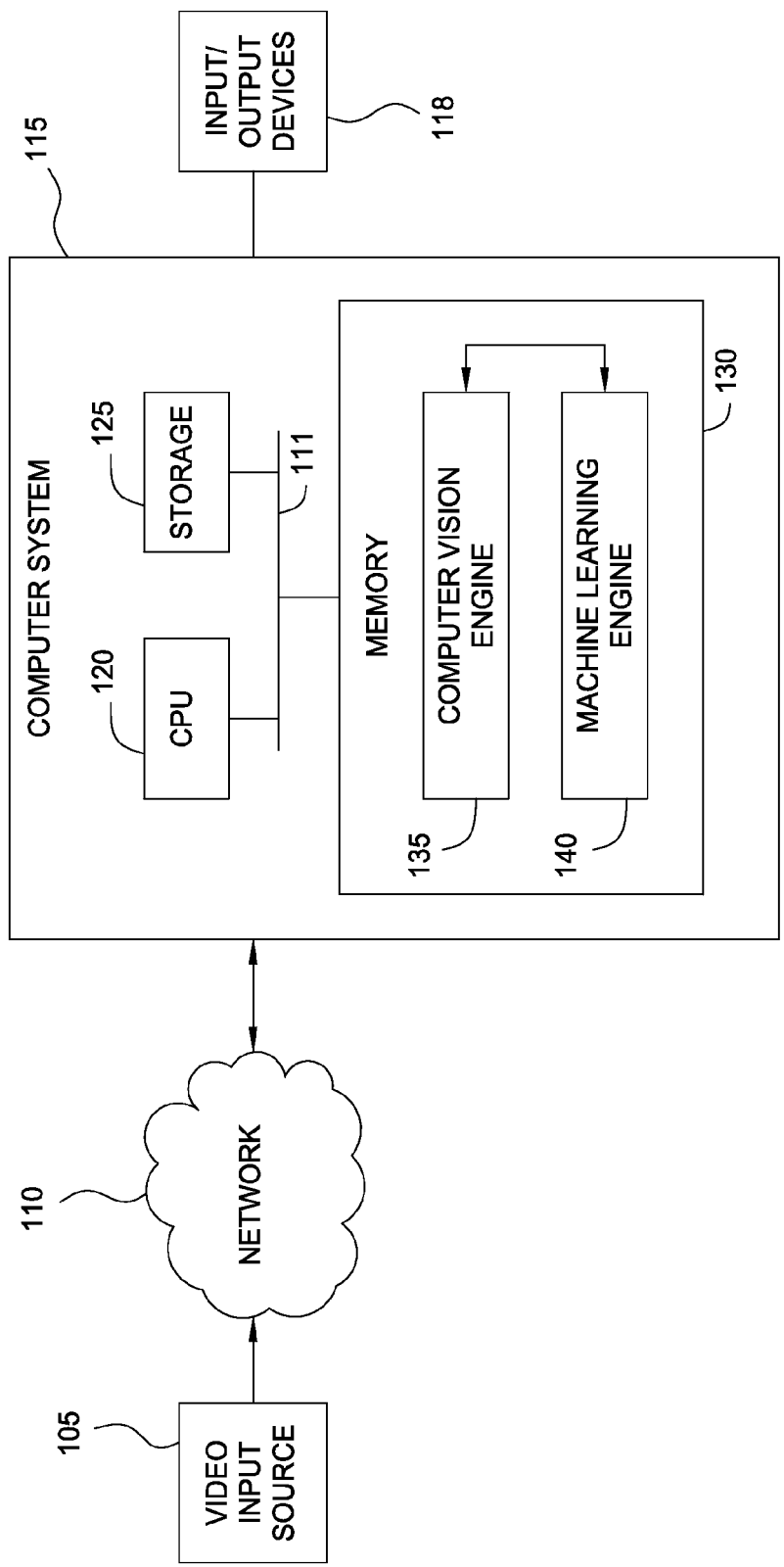
FIG. 1 illustrates components of a video analysis system, according to one embodiment of the invention.

Embodiments of the present invention provide a method and a system for analyzing and learning behavior based on an acquired stream of video frames. A machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In one embodiment, e.g., the machine learning engine may include statistical engines for generating topological feature maps based on observations, as discussed above, and a detection module for detecting feature anomalies. The detection module may be configured to calculate rareness values for observed foreground objects using feature maps generated by statistical engines. A rareness value may indicate how anomalous or unusual an foreground object is given the object's feature(s) and location(s), as opposed to, e.g., the object's kinematic properties. In one embodiment, the rareness value may be determined based at least on a pseudo-Mahalanobis measurement of distance of a position-feature vector of the foreground object to a cluster associated with a smallest mean-squared error between the cluster and the position-feature vector, and on statistical relevance of any clusters associated with mean-squared errors less than a threshold. Further, the sensitivity of detection may be adjusted according to the relative importance of recently observed anomalies. In particular, the detection module may become less sensitive to anomalies which have recently occurred frequently, and vice versa.

In the following, reference is made to embodiments of the invention. However, it should be understood that the invention is not limited to any specifically described embodiment.

Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 which includes both a computer vision engine 135 and a machine-learning engine 140. As described in greater detail below, the computer vision engine 135 and the machine-learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known formats including MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of meta-data regarding the actions and interactions of such objects, and supply this information to the machine-learning engine 140. And in turn, the machine-learning engine 140 may be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type.

In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 may analyze each frame in real-time to derive a set of appearance and kinematic data related to objects observed in the frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results of over network 110.

Figure 2:
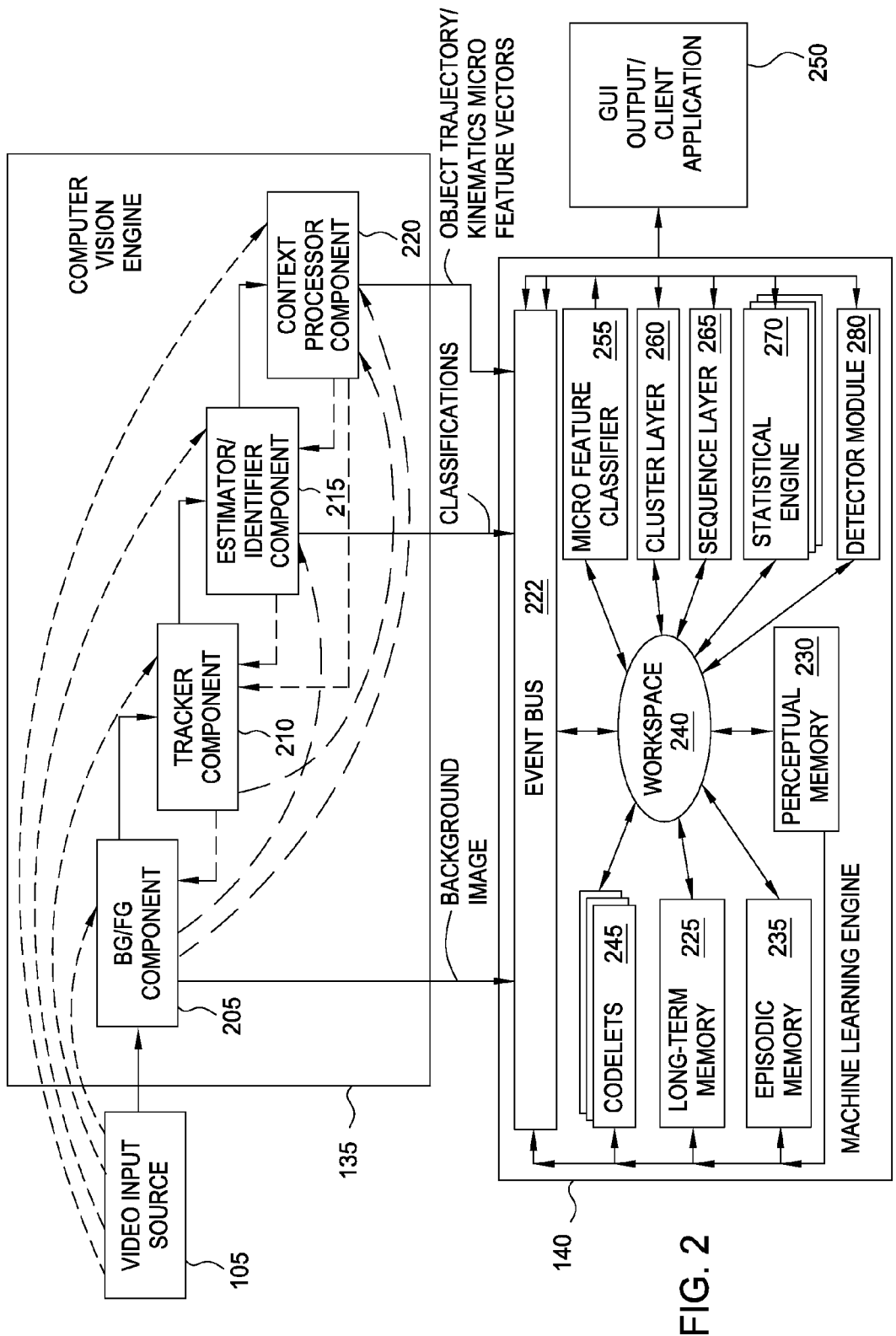
FIG. 2 further illustrates components of the video analysis system shown in FIG. 1, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case and further that additional components may be added (or some may be removed).

In one embodiment, the BG/FG component 205 may be configured to separate each frame of video provided by the video input source 105 into a static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Additionally, pixels classified as depicting scene background maybe used to generate a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of an object depicted by a given foreground patch as it moves about the scene. That is, the tracker component 210 provides continuity to other elements of the system by tracking a given object from frame-to-frame.

The estimator/identifier component 215 may receive the output of the tracker component 210 (and the BF/FG component 205) and identify a variety of kinematic and/or appearance features of a foreground object. Appearance features identified may include, but are not limited to, area derivative (i.e., a change in bounding box size of a tracked object), shadow (e.g., a percentage of the foreground object covered by shadow pixels), shininess (e.g., based on specular reflection of an object), internal energy (e.g., based on how different an object appears in consecutive frames as a result of translations and/or rotations), area (e.g., an area of an object, in pixels, divided by an area of its bounding box), entropy (e.g., based on the colorfulness of an object), gradient histogram (e.g., based on how horizontal/vertical an object or its edges are), color variation (e.g., based on the chromatic appearance of the object), and hue of the object. In general, such appearance features may characterize the appearance of the foreground object, as opposed to its kinematics. In some embodiments, a number of features may be used to provide diversity, and features may be chosen that are reliable, as opposed to noisy. Further, the appearance features may be used to, e.g., learn the appearance properties of the scene and identify feature anomalies given the learned appearance properties, as discussed in greater detail below.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and evaluated (by estimator identifier component 215). For example, the context processor component 220 may package a stream of micro-feature vectors and kinematic observations of an object and output this to the machine-learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete.

The computer vision engine 135 may take the output from the components 205, 210, 215, and 220 describing the motions and actions of the tracked objects in the scene and supply this information to the machine-learning engine 140. Illustratively, the machine-learning engine 140 includes a long-term memory 225, a perceptual memory 230, an episodic memory 235, a workspace 240, codelets 245, a micro-feature classifier 255, a cluster layer 260 and a sequence layer 265. Additionally, the machine-learning engine 140 includes a client application 250, allowing the user to interact with the video surveillance system 100 using a graphical user interface. Further still, the machine-learning engine 140 includes an event bus 222. In one embodiment, the components of the computer vision engine 135 and machine-learning engine 140 output data to the event bus 222. At the same time, the components of the machine-learning engine 140 may also subscribe to receive different event streams from the event bus 222. For example, the micro-feature classifier 255 may subscribe to receive the micro-feature vectors output from the computer vision engine 135.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select which codelets 245 to execute. Each codelet 245 may be a software program configured to evaluate different sequences of events and to determine how one sequence may follow (or otherwise relate to) another (e.g., a finite state machine). More generally, each codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream). The episodic memory 235 stores data representing observed events with details related to a particular episode, e.g., information describing time and space details related to an event. That is, the episodic memory 235 may encode specific details of a particular event, i.e., "what and where" something occurred within a scene, such as a particular vehicle (car A) moved to a location believed to be a parking space (parking space 5) at 9:43 AM.

In contrast, the long-term memory 225 may store data generalizing events observed in the scene. To continue with the example of a vehicle parking, the long-term memory 225 may encode information capturing observations and generalizations learned by an analysis of the behavior of objects in the scene such as "vehicles in certain areas of the scene tend to be in motion," "vehicles tend to stop in certain areas of the scene," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The micro-feature classifier 255 may schedule a codelet 245 to evaluate the micro-feature vectors output by the computer vision engine 135. As noted, the computer vision engine 135 may track objects frame-to-frame and generate micro-feature vectors for each foreground object at a rate of, e.g., 5 Hz. In one embodiment, the micro-feature classifier 255 may be configured to create clusters from this stream of micro-feature vectors. For example, each micro-feature vector may be supplied to an input layer of the ART network (or a combination of a self organizing map (SOM) and ART network used to cluster nodes in the SOM). In response, the ART network maps the micro-feature vector to a cluster in the ART network and updates that cluster (or creates a new cluster if the input micro-feature vector is sufficiently dissimilar to the existing clusters). Each cluster is presumed to represent a distinct object type, and objects sharing similar micro-feature vectors (as determined using the choice and vigilance parameters of the ART network) may map to the same cluster.

For example, the micro-features associated with observations of many different vehicles may be similar enough to map to the same cluster (or group of clusters). At the same time, observations of many different people may map to a different cluster (or group of clusters) than the vehicles cluster. Thus, each distinct cluster in the art network generally represents a distinct type of object acting within the scene. And as new objects enter the scene, new object types may emerge in the ART network.

Importantly, however, this approach does not require the different object type classifications to be defined in advance; instead, object types emerge over time as distinct clusters in the ART network. In one embodiment, the micro-feature classifier 255 may assign an object type identifier to each cluster, providing a different object type for each cluster in the ART network.

In an alternative embodiment, rather than generate clusters from the micro-features vector directly, the micro-feature classifier 255 may supply the micro-feature vectors to a self-organizing map structure (SOM). In such a case, the ART network may cluster nodes of the SOM—and assign an object type identifier to each cluster. In such a case, each SOM node mapping to the same cluster is presumed to represent an instance of a common type of object.

As shown, the machine-learning engine 140 also includes a cluster layer 260 and a sequence layer 265. The cluster layer 260 may be configured to generate clusters from the trajectories of objects classified by the micro-feature classifier 255 as being an instance of a common object type. In one embodiment, the cluster layer 260 uses a combination of a self-organizing map (SOM) and an ART network to cluster the kinematic data in the trajectories. Once the trajectories are clustered, the sequence layer 265 may be configured to generate sequences encoding the observed patterns of behavior represented by the trajectories. And once generated, the sequence layer may identify segments within a sequence using a voting experts technique. Further, the sequence layer 265 may be configured to identify anomalous segments and sequences.

As shown, the machine-learning engine 140 further includes statistical engines 270 and a detector module 280. Each statistical engine may be feature-specific (i.e., unique to a given feature). In addition, each statistical engine may include an ART network which generates and modifies clusters based on observations. In such an ART network, each cluster may be characterized by a mean and a variance from a prototype input representing the cluster. The prototype is generated first as a copy of the input vector used to create a new cluster. Subsequently, as new input vectors are mapped to the cluster, the prototype input (and the mean and variance for the cluster) may be updated (i.e., modified) by the ART network using the new input vectors. Initially, the ART network may be permitted to mature over a period of time (e.g., days), and anomaly alerts pertaining to the ART network may be suppressed during this period.

In one embodiment, the mean and variance of clusters may be the actual mean and variance of input vectors that have mapped to the clusters. For example, when an input vector maps to a cluster, the cluster's mean $X_t$ may be updated as follows:

$$\mu_{t+1} = \frac{(n-1)\mu_{t-1} + \text{Input}}{n}, \quad (1)$$

where n is the number of feature vectors that have mapped to the cluster and $\mu_t$ is the previous mean (note, this differs from typical ART networks, in which the mean is updated as $\mu_{t+1} = \alpha\mu_t + (1-\alpha)\text{Input}$, where $\alpha$ is a constant in [0,1]). Further, the cluster's variance $\sigma_t^2$ may be updated as follows:

$$\sigma_{t+1}^2 = \left[\frac{n-2}{n-1}\sigma_t^2 + \sigma_t^2 + \frac{\text{Input}^2}{n-1}\right] - \frac{n}{n-1}\mu_{t+1}^2, \quad (2)$$

where $\sigma_t^2$ is the previous variance.

In another embodiment, the statistical engine may weight the importance of each cluster by statistical relevance. For example, the statistical engine may keep counts of how many input vectors map to each cluster based on a choice and a vigilance test. In such a case, clusters associated with higher counts may be considered more relevant, and vice versa.

In general, each ART network cluster may represent a type of input vector, discussed in greater detail below, and input vectors which map to a cluster may vary somewhat in feature and/or location value(s). For example, car objects having approximately a given shininess feature value and appearing at approximately a given location in the scene may map to the same ART network cluster. However, the car objects may not have exactly the same shininess and/or location values. Such variations may affect the mean and/or a variance of the cluster (e.g., greater variation in feature and/or location values may result in a greater cluster variance).

In one embodiment, the input and prototype input vectors are of the form (x, y, f), where x and y indicate a location of a given object (e.g., a centroid of the object) and f is a value of a feature of the object, as determined by the estimator/identifier component 215. Here, the location (x, y) may represent the centroid (i.e., center of mass) of the foreground object as it appears in the video frame. And the value f may be a value of a feature of the object, which in one embodiment may lie in the range [0, 1], where 0 may generally represent the absence of a feature or a feature characteristic (e.g., the absence of shininess, the absence of vertical edges, etc.), 1 may represent the presence of the feature, and 0.5 may represent uncertainty about the presence of the feature.

In another embodiment, the input and prototype input vectors may include more than one feature value and be of the form (x, y, $f_1$, $f_2$, . . . ). In a further embodiment, time(s) may also be included in the input vector. In yet another embodiment, the feature(s) used may include one or more of the following: area derivative, shadow, shininess, internal energy, area, entropy, gradient histogram, color variation, and hue.

In addition, each statistical engine 270 may be configured to reinforce, decay, merge, and remove clusters generated by the ART network to improve the robustness and quality of learning. For example, two clusters may be merged if, based on their means and variances, the clusters overlap in 3D (i.e., (x, y, f)) or higher dimensional space. In one embodiment, the overlapping may be required to reach a given threshold, which may be implemented by introducing a constant factor $\beta < 1$ and requiring that the mean of one cluster $\mu_1$ be within $\beta\sigma_2^2$ of the mean of the other cluster $\mu_2$ (i.e., within $\beta$ times the variance of the other cluster) for the clusters to be merged. Reinforcement, decay, merging, and removing of clusters may also be performed according to approaches discussed in U.S. Pat. No. 8,167,430, hereby incorporated by reference in its entirety.

In general, learning by the statistical engines 270 may be activity-driven. For example, cluster reinforcement, decay, etc. may occur less quickly if fewer objects are observed over a period of time, and vice versa. Further, the statistical engines 270 may attempt to avoid over-learning when there is an abundance of activity by generalizing more in such cases.

As discussed, the statistical engines 270 engage in unsupervised learning of the appearances and locations of objects in a scene to generate topological feature maps based on ART network clusters. Each feature map may include one or more position-feature clusters described by their means and variances and created/modified by the statistical engine, and be un-biased in the sense that environmental and technological influences are learned such that repetitive mistakes are forgiven (because they become normal). For example, mis-tracking of an object which produces incorrect (x, y) coordinates, weather changes, etc. may cause false-positives in a traditional video analytics system where patterns and maps are manually defined. By contrast, the approach discussed herein learns such object-tracking mistakes, weather changes, etc. such that they affect the video analytics system less.

The detector module 280 may be configured to detect and report feature anomalies, as discussed in greater detail below. That is, the detector module 230 may determine whether one or more feature properties at a given location are unusual or anomalous relative to previously observed feature properties and their locations. If a feature anomaly is detected, the detector module may further report the anomaly by, for example, issuing an alert to a user interface of the GUI/output client application 250.

Detecting and Reporting Feature Anomalies in a Machine-Learning Video Analytics System As noted above, a machine-learning video analytics system may be configured to use a computer vision engine to observe a scene, generate information streams of observed activity, and to pass the streams to a machine learning engine. In turn, the machine learning engine may engage in an undirected and unsupervised learning approach to learn patterns regarding the object behaviors in that scene. Thereafter, when unexpected (i.e., abnormal or unusual) behavior is observed, alerts may be generated.

In one embodiment, e.g., the machine learning engine may include statistical engines for generating topological feature maps based on observations, as discussed above, and a detection module for detecting feature anomalies. The detection module may be configured to calculate rareness values for observed foreground objects using feature maps generated by statistical engines. A rareness value may indicate how anomalous or unusual an foreground object is given the object's feature(s) and location(s), as opposed to, e.g., the object's kinematic properties. In one embodiment, the rareness value may be determined based at least on a pseudo-Mahalanobis measurement of distance of a position-feature vector of the foreground object to a cluster associated with a smallest mean-squared error between the cluster and the position-feature vector, and on statistical relevance of any clusters associated with mean-squared errors less than a threshold. Further, the sensitivity of detection may be adjusted according to the relative importance of recently observed anomalies. In particular, the detection module may become less sensitive to anomalies which have recently occurred frequently, and vice versa.

Figure 3:
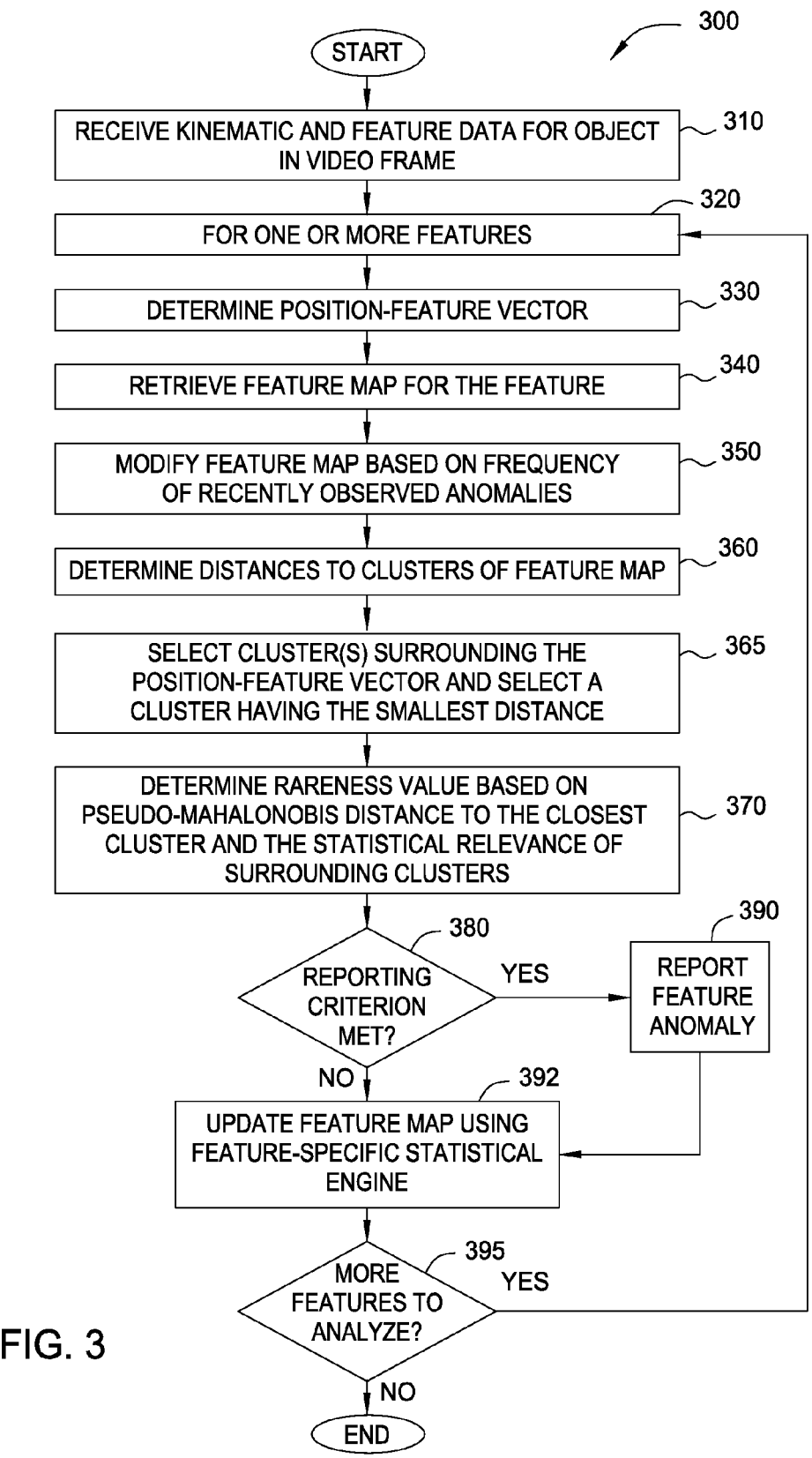
FIG. 3 illustrates a method for detecting and reporting feature anomalies, according to one embodiment of the invention.

FIG. 3 illustrates a method 300 for detecting and reporting feature anomalies, according to one embodiment. As shown, the method 300 begins at step 310, where a detection module receives kinematic and feature data for a foreground object in a video frame. As discussed, a computer vision engine may analyze the video frame extract foreground objects in a frame and to derive a set of feature and kinematic data related to the foreground objects. The detection module may receive such data for processing.

At step 320, the detection module loops through one or more features. In general, the detection module may not process every feature for which data is received. For example, certain features may be more relevant than other features for detecting anomalies within a scene. In one embodiment, the feature(s) processed may include one or more (or a combination) of the following: area derivative, shadow, shininess, internal energy, area, entropy, gradient histogram, and hue.

At step 330, the detection module determines position and feature values for a feature. In one embodiment, the detection module may parse the kinematic and feature data received at step 310 to determine a three-dimensional position-feature vector (x, y, f) which represents the location and feature values for processing. In one embodiment, the location (x, y) may represent the centroid (i.e., center of mass) of the foreground object as it appears in the video frame, while f may be a value of a feature of the object, which may, e.g., lie in the range [0, 1], with 0 generally representing the absence of a feature or a feature characteristic (e.g., the absence of shininess, the absence of vertical edges, etc.), 1 may represent the presence of the feature, and 0.5 may represent uncertainty about the presence of the feature.

At step 340, the detection module retrieves (i.e., makes a local copy of) a feature map for the feature. As discussed, the feature map may be generated by a statistical engine specific to the feature. Further, the feature map may include one or more clusters described by their means and variances and created/modified by the statistical engine.

At step 350, the detection module modifies the local feature map based on the frequency of observed feature anomalies. In general, the detection module may modify the local feature map to account for the frequency of recently observed anomalies. For example, more frequently observed anomalies may be less important, and vice versa, because the more frequently an "anomaly" is observed, the less anomalous it becomes. In one embodiment, the detection module may modify the feature map to account for the frequency of recently (e.g., within the past 10 minutes) observed anomalies by increasing the variance (e.g., by multiplying the variance by a constant) of clusters associated with a greater number of recently observed anomalies. Decay may further be built into this process such that the variance of clusters associated with fewer recently observed anomalies are increased less (or not increased at all).

At step 360, the detection module determines distances between the position-feature vector and clusters of the modified feature map. In one embodiment, the detection module may calculate mean-squared errors between the position-feature vector (x, y, f) and the mean value ($\mu_x$, $\mu_y$, $\mu_f$) of each of the clusters:

$$d = \sqrt{\frac{(\mu_x - x)^2 + (\mu_y - y)^2 + (\mu_f - f)^2}{3}} \quad (3)$$

At step 365, the detection module selects cluster(s) surrounding the position-feature vector and further selects a cluster closest to the position-feature vector. In one embodiment, the detection module may select cluster(s) associated with mean-squared error(s) less than threshold(s) as the surrounding cluster(s). Here, the threshold(s) may be cluster-specific, and may be, e.g., a predefined number for unmerged clusters and the value of the cluster variance for merged clusters. If one or more calculated distances (e.g., mean-squared error values) are less than the threshold(s), then the detection module may select the clusters associated with those values. Further, regardless of the threshold(s), the detection module selects the cluster associated with the smallest mean-squared error (also referred to herein as the "closest cluster"). Of course, persons skilled in the art will recognize that distance measurements other than mean-squared error may instead be used to select cluster(s) for purposes of selecting the closest cluster and/or the surrounding cluster(s).

In another embodiment, the detection module may further apply a vigilance test, such as that discussed in U.S. Pat. No. 8,167,430, in mapping the position-feature vector to the closest cluster and/or the surrounding cluster(s). The vigilance test may generally compute a similarity between an input vector and a cluster prototype (e.g., the prototype vector for the closest cluster) and determine whether the similarity exceeds a vigilance parameter. If such is the case, the input may be mapped to that cluster. If, however, the input does not match any existing cluster under the vigilance test, a new cluster may be created by storing a prototype vector similar to the input vector. The vigilance parameter has considerable influence on an ART network: higher vigilance produces many, fine-grained clusters, while lower vigilance results in more-general clusters.

At step 370, the detection module determines a rareness value based on a distance to the closest cluster and the statistical relevance of the selected cluster(s) having distance(s) less than the threshold(s). In one embodiment, the detection module may determine the rareness value using the following formula:

$$\text{Rareness} = 1 - [\alpha * Aprior + (1 - \alpha) * Aposteriori] \quad (4)$$

where $$Aprior = \frac{\sum \text{statistical relevance of cluster(s) having distance less than threshold(s)}}{\text{total number of observations}},$$

Aposteriori is the pseudo-Mahalanobis distance of the position-feature vector to the closest cluster, and α is a constant. Here, the Rareness value ranges from 0 to 1, with 0 indicating a normal (i.e., not rare) observation and 1 indicating a rare observation. As discussed, the statistical relevance of a given cluster may be a count of the number of previous observations which have mapped to that cluster (e.g., via a choice and/or vigilance test). Note, Aprior may be 0 if, at step 365, the detection module determines that none of the calculated distance(s) is less than the threshold(s). In such a case, the rareness value may nevertheless be high because Aposteriori is calculated based on the closest cluster, which may not actually be a close cluster in this case.

At step 380, the detection module determines whether a reporting criterion (or criteria) has been met. For example, the detection module may determine whether the rareness value exceeds (or is less than, depending on the implementation) a threshold (e.g., a ninety-ninth percentile threshold). If the detection module determines that reporting criterion/criteria have been met, then at step 390 the detection module reports a feature anomaly. For example, the detection module may issue an alert to a user interface, thereby notifying the user of the anomaly. Further, the detection module may throttle or normalize alerts so as to limit the number of alerts (or alerts of each type) that are reported. Further yet, the detection module may modify the factor (e.g., the multiplicative constant) by which it increases the variance of the closest cluster at step 350 to account for the current feature anomaly.

If the detection module determines at step 380 that reporting criterion/criteria have not been met, or after reporting an anomalous event at step 390, the method 300 continues at step 392, where a feature-specific statistical engine updates the feature map based on the current feature and location data. As discussed, the statistical engine may include an ART network which creates/modifies clusters based on the feature and location data. In addition, the statistical engine may reinforce, decay, merge, or delete clusters of the ART network based on the feature and location data.

At step 395, the detection module determines whether there are more features to analyze. If there are more features to analyze, the method 300 returns to step 320 to process data associated with another feature. Otherwise, the method 300 ends thereafter.

Figure 4:
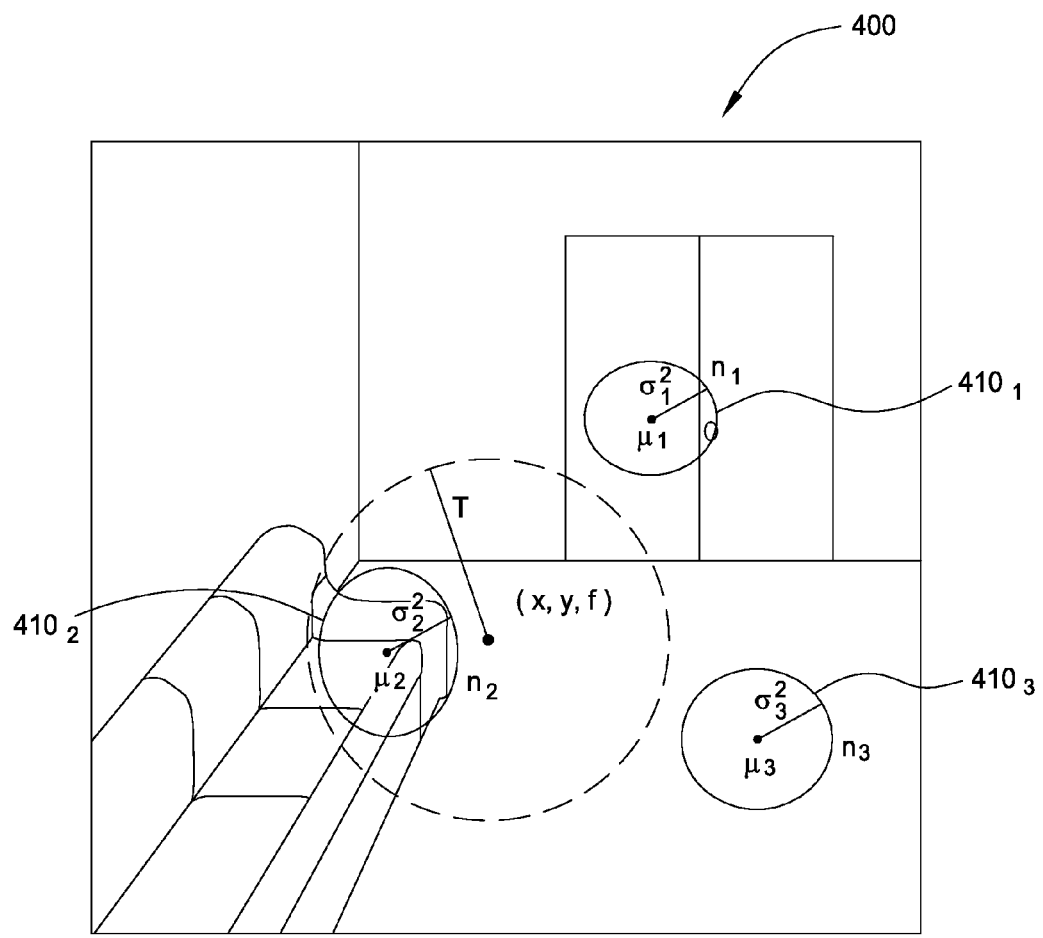
FIG. 4 illustrates an example feature map, according to one embodiment of the invention.

FIG. 4 illustrates an example feature map being used to determine feature anomalies, according to an embodiment. As shown, the feature map is associated with a scene 400 and includes clusters 410$_{1-3}$ described by their means $\mu_{1-3}$ and variances $\sigma_{1-3}^2$. The feature map may be generated by a statistical engine specific to one or more features, such as area, area derivative, shadow, shininess, internal energy, entropy, gradient histogram, color variation, or hue. As discussed, the statistical engine may be configured to engage in unsupervised learning of the appearances and locations of objects in a scene to generate the feature maps based on ART network clusters. In one embodiment, the statistical engine may reinforce, decay, merge, and remove clusters generated by the ART network. The statistical engine may also track the statistical significance of the clusters based on, e.g., counts $n_{1-3}$ of vectors which have mapped to those clusters.

Given an input position-feature vector (x, y, f), the detection module may determine a rareness value based on a distance to the closest cluster and statistical relevance of the selected cluster(s) having distance(s) less than a threshold T, according to equation (4). Illustratively, pseudo-Mahalanobis distance to the cluster 410$_2$, as well as the statistical relevance $n_2$ of the cluster 410$_2$, may be used in equation (4), as cluster 410$_2$ is the closest cluster to the example input vector (x, y, f) and the only cluster within threshold distance T to the input vector (x, y, f).

As discussed, the detection module may report an anomalous event (e.g., by issuing an alert to a user interface) if the rareness value determined using equation (4) exceeds (or is below, depending on the implementation) a threshold value. Further, the statistical engine may update the feature map which includes clusters 410$_{1-3}$ based on the input position-feature vector (x, y, f), as discussed above.

Although discussed above with respect to video frames, non-video data may also be used. For example, a map may be used in lieu of a video frame, and the feature used may include global positioning system (GPS) coordinates, radio-frequency identification (RFID) tags, and the like.

While the foregoing is directed to embodiments of the present invention, other and further embodiments of the invention may be devised without departing from the basic scope thereof, and the scope thereof is determined by the claims that follow.

What is claimed is:

1. A computer-implemented method for analyzing a scene, the method comprising:
   receiving kinematic and feature data for an object in the scene;
   determining, via one or more processors, a position-feature vector from the received data, the position-feature vector representing a location and one or more feature values at the location;
   retrieving a feature map corresponding to the position-feature vector, wherein the feature map includes one or more position-feature clusters, wherein the feature map includes one or more adaptive resonance theory (ART) network clusters;
   determining a rareness value for the object based at least on the position feature vector and the feature map, wherein the rareness value is determined based on at least a pseudo-Mahalanobis distance of the position-feature vector to a closest one of the clusters and on statistical relevance of clusters less than a threshold distance from the position-feature vector; and
   reporting the object as anomalous if the rareness value meets given criteria.

2. The method of claim 1, further comprising, updating the feature map using the position-feature vector.

3. The method of claim 1, wherein distances to the clusters less than the threshold distance are determined as mean-squared error distances.

4. The method of claim 3, wherein the rareness value is determined as $$\text{Rareness} = 1 - [\alpha * Aprior + (1 - \alpha) * Aposteriori],$$

where $$Aprior = \frac{\sum \text{statistical relevance of cluster(s) having distance less than threshold}}{\text{total number of observations}},$$

Aposteriori is the pseudo-Mahalanobis distance of the position-feature vector to the closest cluster, and $\alpha$ is a constant.

5. The method of claim 1, wherein mean and variance of the clusters are actual mean and variance of input vectors which have mapped to the clusters, wherein each cluster is weighted by statistical relevance, and wherein the clusters are reinforced, decayed, merged, and removed by a statistical engine.

6. The method of claim 1, further comprising, modifying the feature map based on a frequency of observed anomalies before determining the rareness value.

7. The method of claim 6, wherein modifying the feature map includes increasing variances of clusters in the feature map based on counts of observed anomalies associated with each cluster.

8. The method claim 1, wherein the one or more appearance features include at least one of area, area derivative, shadow, shininess, internal energy, area, entropy, gradient histogram, hue, global positioning system (GPS) coordinates, and radio-frequency identification (RFID) tags.

9. The method of claim 1, wherein the kinematic and feature data are extracted from video frames captured by a video camera.

10. A non-transitory computer-readable storage medium storing instructions, which when executed by a computer system, perform operations for analyzing a scene, the operations comprising:

receiving kinematic and feature data for an object in the scene;

determining, via one or more processors, a position-feature vector from the received data, the position-feature vector representing a location and one or more feature values at the location;

retrieving a feature map corresponding to the position-feature vector, wherein the feature map includes one or more position-feature clusters, wherein the feature map includes one or more adaptive resonance theory (ART) network clusters;

determining a rareness value for the object based at least on the position feature vector and the feature map, wherein the rareness value is determined based on at least a pseudo-Mahalanobis distance of the position-feature vector to a closest one of the clusters and on statistical relevance of clusters less than a threshold distance from the position-feature vector; and reporting the object as anomalous if the rareness value meets given criteria.

11. The computer-readable storage medium of claim 10, the operations further comprising, updating the feature map using the position-feature vector.

12. The computer-readable storage medium of claim 10, wherein distances to the clusters less than the threshold distance are determined as mean-squared error distances.

13. The computer-readable storage medium of claim 12, wherein the rareness value is determined as $$\text{Rareness} = 1 - [\alpha * Aprior + (1 - \alpha) * Aposteriori],$$

where $$Aprior = \frac{\sum \text{statistical relevance of cluster(s) having distance less than threshold}}{\text{total number of observations}},$$

Aposteriori is the pseudo-Mahalanobis distance of the position-feature vector to the closest cluster, and $\alpha$ is a constant.

14. The computer-readable storage medium of claim 10, wherein mean and variance of the clusters are actual mean and variance of input vectors which have mapped to the clusters, wherein each cluster is weighted by statistical relevance, and wherein the clusters are reinforced, decayed, merged, and removed by a statistical engine.

15. The computer-readable storage medium of claim 10, the operations further comprising, modifying the feature map based on a frequency of observed anomalies before determining the rareness value.

16. The computer-readable storage medium of claim 15, wherein modifying the feature map includes increasing variances of clusters in the feature map based on counts of observed anomalies associated with each cluster.

17. The computer-readable storage medium of claim 10, wherein the one or more appearance features include at least one of area, area derivative, shadow, shininess, internal energy, area, entropy, gradient histogram, hue, global positioning system (GPS) coordinates, and radio-frequency identification (RFID) tags.

18. The computer-readable storage medium of claim 17, wherein the kinematic and feature data are extracted from video frames captured by a video camera.

19. A system, comprising:
a processor; and
a memory, wherein the memory includes an application program configured to perform operations for analyzing a scene, the operations comprising:

receiving kinematic and feature data for an object in the scene, determining, via one or more processors, a position-feature vector from the received data, the position-feature vector representing a location and one or more feature values at the location, retrieving a feature map corresponding to the position-feature vector, wherein the feature map includes one or more position-feature clusters, wherein the feature map includes one or more adaptive resonance theory (ART) network clusters, determining a rareness value for the object based at least on the position feature vector and the feature map, wherein the rareness value is determined based on at least a pseudo-Mahalanobis distance of the position-feature vector to a closest one of the clusters and on statistical relevance of clusters less than a threshold distance from the position-feature vector, and reporting the object as anomalous if the rareness value meets given criteria.

20. The system of claim 19, wherein distances to the clusters less than the threshold distance are determined as mean-squared error distances.

21. The system of claim 20, wherein the rareness value is determined as $$\text{Rareness} = 1 - [\alpha * Aprior + (1 - \alpha) * Aposteriori],$$

where $$Aprior = \frac{\sum \text{statistical relevance of cluster(s) having distance less than threshold}}{\text{total number of observations}},$$

Aposteriori is the pseudo-Mahalanobis distance of the position-feature vector to the closest cluster, and $\alpha$ is a constant.

22. The system of claim 19, wherein mean and variance of the clusters are actual mean and variance of input vectors which have mapped to the clusters, wherein each cluster is weighted by statistical relevance, and wherein the clusters are reinforced, decayed, merged, and removed by a statistical engine.

* * * * *